3,217,009
1-(3-OXIMINO-3-PHENYLPROPYL)-4-PHENYL-4-PROPIONOXY-PIPERIDINE

Philip M. Carabateas, Rensselaer, N.Y., assignor to Sterling Drug Inc., New York, N.Y., a corporation of Delaware
No Drawing. Filed Dec. 18, 1959, Ser. No. 860,368
1 Claim. (Cl. 260—294.3)

This invention relates to compositions of matter known in the art of chemistry as substituted-piperidines, to processes for making such compositions and to intermediates for use in such processes.

Piperidines having a wide variety of aryl and lower-acyloxy or lower-carbalkoxy substituents attached to the 4-position carbon atom of the piperidine ring are known in the art. Such substituted-piperidines are also known in which one or more lower-aliphatic hydrocarbon radicals are attached to other carbon atoms of the piperidine ring. Piperidines so substituted are known having various radicals attached to the nitrogen atom of the piperidine ring, such as lower-alkyl, aralkyl, aralkenyl, aryloxyalkyl, and arylmercaptoalkyl. Recently published are 4-aryl-4-(lower-carbalkoxy)-piperidines having an omega-aromatic-omega-oxo-(lower-alkyl) radical attached to the nitrogen atom of the piperidine ring.

It is an object of the present invention to provide useful compositions of the aforesaid class of substituted-piperidines having a novel combination of substituents attached to the 1- and the 4-positions of the piperidine ring.

The invention, in its composition aspect, is described as residing in the concept of a composition having a molecular structure in which a lower-acyloxy substituent is attached to the remaining 4-position of 4-aryl-1-[omega-aromatic-omega-oxo-(lower-alkyl)]-piperidines.

In its process aspect the invention is described as residing in the concept of reacting a 4-aryl-1-[omega-aromatic-omega-oxo-(lower-alkyl)]-4-piperidinol with a lower-acylating agent. An acyl anhydride or acyl halide is preferably used as the lower-acylating agent. When acyl is lower-alkanoyl and a lower-alkanoyl anhydride is used as the acylating agent, the reaction is carried out preferably by heating the anhydride and the intermediate 4-aryl-1-[omega-aromatic-omega-oxo-(lower-alkyl)]-4-piperidinol as its acid-addition salt, preferably the hydrohalide, preferably with but optionally without an inert solvent such as benzene or toluene. While the reaction was found to proceed readily by heating the reactants on a steam bath, other temperatures in the range of about 70 to 150° C. can be used. Alternatively, the acylation can be carried out by reacting an acyl halide, e.g., an alkanoyl chloride, with the 4-aryl-1-[omega-aromatic-omega-oxo-(lower-alkyl)]-4-piperidinol preferably in free base form at room temperature, i.e., about 20-25° C., preferably in a dry solvent inert under the conditions of the reaction, e.g., chloroform; alternatively, the reaction with the acyl halide can be carried out using the piperidinol in acid addition salt form and using higher temperatures, e.g., 50-70° C.

The invention, in its intermediate composition aspect, is described as residing in the concept of a composition having a molecular structure in which a hydroxy substituent is attached to the remaining 4-position of 4-aryl-1-[omega-aromatic-omega-oxo-(lower-alkyl)] - piperidines. These intermediate embodiments are prepared by reacting a 4-aryl-4-piperidinol with an omega-aromatic-omega-oxo-(lower-alkylating) agent. For the preparation of preferred intermediate embodiments, the omega-aromatic-omega-oxo-(lower-alkylating) agent is an N-(3-oxo-3-aromatic-propyl) - N,N,N - tri-(lower-alkyl)-ammonium halide, e.g., N-(3-oxo-3-phenylpropyl)-N,N,N-trimethyl-ammonium iodide. The reaction is carried out conveniently at room temperature, i.e., about 20-25° C., in the presence of an acid-acceptor, e.g., anhydrous sodium carbonate, preferably in the presence of a solvent inert under the conditions of the reaction as for example, dimethylformamide, methanol, ethanol, benzene, toluene, and the like. Higher temperature can be used but to no particular advantage. The purpose of the acid-acceptor is to take up the hydrogen halide (or HAn) which is split out during the course of the reaction. The acid-acceptor is a basic substance which forms freely water-soluble by-products easily separable from the products of the reaction, including for example, sodium carbonate, potassium carbonate, sodium acetate, sodium hydroxide, potassium hydroxide, sodium alkoxides, potassium alkoxides, sodium amide, and the like.

The preferred intermediate embodiments also can be prepared by reacting, preferably heating, 4-aryl-4-piperidinol, preferably as its acid-addition salt, e.g., HCl salt, with a methyl aromatic ketone, e.g., acetophenone as used in the preparation of 1-(3-oxo-3-phenylpropyl)-4-phenyl-4-piperidinol by heating 4-phenyl-4-piperidinol hydrochloride with paraformaldehyde and acetophenone.

The intermediate embodiments of my invention also can be prepared by using as the omega-aromatic-omega-oxo-(lower-alkylating) agent an omega-aromatic-omega-oxo-(lower-alkyl) halide, preferably the chloride, bromide or iodide; for example, 1-(4-oxo-4-phenylbutyl)-4-phenyl-4-piperidinol is prepared by reacting 4-phenyl-4-piperidinol with 4-oxo-4-phenylbutyl bromide. The reaction is preferably carried out by heating the reactants, with or without an appropriate solvent inert under the reaction conditions, e.g., n-butanol, chloroform, at a temperature between about 50° C. and 150° C. A wide variety of omega-oxo-omega-aromatic-(lower-alkylating) halides are known. For example, and without limiting the generality of the foregoing, among the suitable known such agents are:

2-oxo-2-phenylethyl chloride, bromide and iodide,
3-oxo-3-phenyl-2-propyl bromide,
3-oxo-3-phenylpropyl chloride and bromide,
4-oxo-4-phenylbutyl bromide,
4,4-diethyl-5-oxo-5-phenylpentyl chloride,
5-oxo-5-phenyl-2-pentyl chloride,
5-oxo-5-phenyl-3-pentyl iodide,
4-1(4-methylphenyl)-4-oxobutyl chloride,
3-(2-hydroxy-4-methoxyphenyl)-3-oxo-2-propyl chloride,
2-(4-ethoxyphenyl)-2-oxoethyl bromide,
2-oxo-2-(2,4,6-trimethoxyphenyl)ethyl bromide,
2-(4,5-dimethoxy-2-methylphenyl)-2-oxoethyl chloride,
2-(3-iodo-4-methoxyphenyl)-2-oxoethyl chloride,
3-(3,4-dimethoxyphenyl)-3-oxopropyl bromide and chloride,
3-oxo-3-(4-methoxyphenyl)propyl chloride,
3-oxo-3-(2,4,6-trimethylphenyl)propyl chloride,
3-(4-hydroxyphenyl)-3-oxopropyl chloride,
4-(2-hydroxy-3-methylphenyl)-4-oxo-2-butyl chloride,
2-(1-naphthyl)-2-oxoethyl chloride and iodide,
2-(2-naphthyl)-2-oxoethyl chloride, bromide and iodide,
3-(1-naphthyl)-3-oxopropyl chloride,
3-(4-bromo-1-naphthyl)-3-oxopropyl chloride,
3-(1,4-dimethyl-2-naphthyl)-3-oxopropyl chloride,
3-oxo-2-(2-thienyl)ethyl chloride and bromide,
2-oxo-2-(2-pyridyl)ethyl bromide, and the like.

The physical embodiments of the invention, both intermediates and final products, are white, crystalline solids, slightly soluble in water in the form of acid-addition salts and soluble in ethyl alcohol. The final products, possess the inherent applied use characteristics of exerting a pronounced analgesic effect in animal organisms, as evidenced by pharmacological evaluation in rats according to standard test procedures.

Another aspect of the invention are oximino derivatives of said final products. These derivatives, i.e. 4-acyloxy-4-aryl - 1 - [omega-aromatic-omega - oximino-(lower-alkyl)]-piperidines, are useful in identifying the final products and also in having said analgesic activity possessed by the final products. The oximino derivatives are prepared by reacting the final products with hydroxylamine utilizing operating conditions ordinarily employed for converting a ketone into its oximino derivative.

The foregoing is a general description of the manner and process of making and using the invention so as to enable any person skilled in the art of chemistry to make and use the same.

The molecular structures of the compounds of the invention are established by their mode of synthesis and corroborated by the correspondence of calculated and found values for the elementary analyses for representative examples.

The best general mode contemplated by the inventor of carrying out his invention will now be set forth, as follows:

Intermediates

Place one mole part of 4-phenyl-4-piperidinol, one mole part of 2-oxo-2-phenylmethyl bromide, two mole parts of sodium carbonate, and about 500 cc. of n-butanol per mole of said piperidinol in a reactor provided with a reflux condenser. Heat the reaction mixture at refluxing temperature for about twenty-four hours. Filter and concentrate the filtrate under reduced pressure to remove the solvent. Take up the concentrate in ether, filter, and remove the ether under reduced pressure, thereby to obtain the intermediate solid 1-(2-oxo-2-phenylpropyl)-4-phenyl-4-piperidinol.

Alternatively, and to illustrate the aforementioned specific method of preparing preferred intermediate embodiments, the best mode of carrying out such procedure will now be set forth, as follows:

Place 19.5 g. of N-(3-oxo-3-phenylpropyl)-N,N,N-trimethylammonium iodide, 10.6 g. of 4-phenyl-4-piperidinol, 12.7 g. of anhydrous sodium carbonate and 100 cc. of dimethylformamide in a reactor provided with a stirrer. Stir the reaction mixture at room temperature (about 25° C.) for about three hours and at the same time pass a slow stream of nitrogen into the stirred mixture. Trimethylamine is given off rapidly during the first thirty minutes, and slowly thereafter. Pour the reaction mixture into one liter of water. Collect the resulting white precipitate, wash it with water, allow it to air-dry at room temperature and recrystallize it from benzene-cyclohexane. This product, 1-(3-oxo-3-phenylpropyl)-4-phenyl-4-piperidinol melts at 132.4–134.8° C. (corr.) and is obtained in about a 80% yield.

*Analyis.*—Calcd. for $C_{20}H_{23}NO_2$: C, 77.61; H, 7.49; N, 4.53. Found: C, 77.36; H, 7.25; N, 4.52.

Suspend a small quantity of 1-(3-oxo-3-phenylpropyl)-4-phenyl-4-piperidinol in ethanol; add thereto a solution of hydrogen chloride in ethanol followed by ether; and allow the resulting solution to stand. Collect the crystalline hydrochloride salt which separates and recrystallize it from ethanol to yield the purified 1-(3-oxo-3-phenylpropyl)-4-phenyl - 4 - piperidinol hydrochloride, M.P. 189.5–191° C.

Following the foregoing procedure using 12.8 g. of N-(3-oxo - 3 - phenylpropyl)-N,N,N-trimethylammonium iodide, 5.73 g. of 3-methyl-4-phenyl-4-piperidinol, 6.5 g. of anhydrous sodium carbonate and 50 cc. of dimethylformamide, there is obtained 8.4 g. (86.7% yield) of the intermediate product, 3-methyl-1-(3-oxo-3-phenylpropyl)-4-phenyl-4-piperidinol, M.P. 143–145° C., when recrystallized from benzene-cyclohexane.

*Analysis.*—Calcd. for $C_{21}H_{25}NO_2$: N, 4.33. Found: N, 4.28.

3-methyl-1-(3-oxo-3-phenylpropyl) - 4 - phenyl-4-piperidinol hydrochloride is formed following the procedure described above for the preparation of 1-(3-oxo-3-phenyl)-4-phenyl-4-piperidinol hydrochloride.

Alternatively, and to illustrate the second aforementioned specific method of preparing preferred intermediate embodiments, the best mode of carrying out such procedure will now be set forth, as follows:

Reflux a mixture containing 21.4 g. of 4-phenyl-4- piperidinol hydrochloride, 3.0 g. of paraformaldehyde, 12.1 g. of acetophenone and 20 cc. of absolute ethanol for about thirty minutes. Add another 3.0 g. portion of paraformaldehyde and continue refluxing the reaction mixture for an additional three and one-half hours. Allow the reaction mixture to cool and stand for two days. Thoroughly chill the partially crystallized reaction mixture in ice and collect the precipitated solid. Recrystallize the solid from absolute ethanol to give about 10.6 g. (30.6% yield) of 1-(3-oxo-3-phenylpropyl)-4-phenyl-4-piperidinol in the form of its hydrochloride, M.P. 187–189.4° C. (corr.).

*Analysis.*—Calcd. for $C_{20}H_{23}NO_2 \cdot HCl$: C, 69.45; H, 6.99; Cl, 10.25. Found: C, 69.13; H, 7.19; Cl, 10.55.

Final products

Reflux a mixture containing 6.0 g. of 1-(3-oxo-3-phenylpropyl)-4-phenyl-4-piperidinol hydrochloride and 50 cc. of propionic anhydride until all the solid hydrochloride dissolves. Continue heating the reaction mixture on a steam bath overnight. Concentrate the reaction mixture in vacuo and triturate the resulting viscous oily material with ether to yield a semi-solid. Recrystallize this mixture first from ethyl acetate and then from acetone, using decolorizing charcoal with the acetone, to yield about 1.7 g. (24.4% yield), of the product, 1-(3-oxo-3-phenylpropyl)-4-phenyl - 4 - propionoxypiperidine hydrochloride, M.P. 147.6–152.8° C. (corr.).

*Analysis.*—Calcd. for $C_{23}H_{27}NO_3 \cdot HCl$: C, 68.73; H, 7.02; Cl, 8.82. Found: C, 68.39; H, 7.14; C, 9.10.

To prepare this product in its free base form, dissolve the hydrochloride salt in water, treat the solution with aqueous sodium hydroxide solution, extract the liberated basic product with benzene, dry the benzene extract over anhydrous sodium sulfate, and remove the benzene by distilling in vacuo.

Pharmacological evaluation of 1-(3-oxo-3-phenylpropyl)-4-phenyl-4-propionoxypiperidine hydrochloride in aqueous solution administered to rats subcutaneously using the D'Amour-Smith method has shown that this compound is about thirteen hundred and fifty times as potent an analgesic as meperidine hydrochloride on a molar basis in terms of the bases.

Alternatively, the above product can be prepared as follows: Dissolve 135 g. of 1-(3-oxo-3-phenylpropyl)-4-phenyl-4-piperidinol in 700 cc. of dry chloroform and dry the solution over calcium chloride. Filter off the calcium chloride and to the clear solution add 41 g. of propionyl chloride whereupon there follows an exothermic reaction. Allow the reaction mixture to stand at room temperature for about two hours and remove the chloroform by distilling the mixture on a steam bath at atmospheric pressure. Add ether to the remaining material and allow the mixture to stand overnight in a refrigerator. Decant the ether and boil the semi-solid material that remains with one liter of ethyl acetate. Cool the mixture; collect the solid by filtration; and wash the solid first with ethyl acetate and then with dry ether. Dry the resulting solid product in vacuo at 60° C. There is obtained about 121 g. (87% yield) of 1-(3-oxo-3-phenylpropyl)-4-phenyl-4 - propionoxypiperidine hydrochloride, M.P. 157.4–159.0° C. (corr.).

*Analysis.*—Calcd. for $C_{23}H_{27}NO_3 \cdot HCl$: Cl, 8.83; O, 12.00. Found: Cl, 8.77; O, 12.05.

3-methyl-1-(3-oxo-3-phenylpropyl) - 4 - phenyl-4-propionoxypiperidine hydrochloride is prepared as follows: Dissolve 8.6 g. of 3-methyl-1-(3-oxo-3-phenylpropyl)-4- phenyl-4-piperidinol hydrochloride in 40 cc. of chloroform and add thereto a solution containing 3 cc. of propionyl chloride in 10 cc. of chloroform. Reflux the resulting reaction mixture for twenty-four hours and then remove the chloroform solvent by distilling in vacuo. To the remaining oil add 35% aqueous sodium hydroxide solution until the mixture is alkaline and extract the basic mixture with ether. Dry the ether extract over anhydrous sodium sulfate and to the dried ether solution add a solution containing hydrogen chloride in ether. Boil the resulting gummy precipitate with a mixture of ethyl acetate and acetone. Recrystallize the resulting solid from acetone to yield about 1.9 g. (17.5% yield) of the white crystalline product, 3-methyl-1-(3-oxo-3 phenylpropyl)-4-phenyl - 4 - propionoxypiperidine hydrochloride monohydrate, M.P. 152.4–156.2° C. (corr.).

*Analysis.*—Calcd. for $C_{24}H_{29}NO_3 \cdot HCl \cdot H_2O$: C, 66.40; H, 7.43; Cl, 8.17; $H_2O$, 4.14. Found: C, 66.69; H, 7.13; Cl, 8.18; $H_2O$, 4.15.

To obtain 3-methyl - 1 - (3-oxo-3-phenylpropyl)-4-phenyl-4-propionoxypiperidine in free base form, dissolve the hydrochloride salt in water, treat the solution with aqueous sodium hydroxide solution, extract the alkaline solution with benzene, dry the benzene extract over anhydrous sodium sulfate and remove the benzene by distilling in vacuo.

Pharmacological evaluation of 3-methyl-1-(3-oxo-3-phenylpropyl)-4-phenyl - 4 - propionoxypiperidine hydrochloride monohydrate in aqueous solution administered to rats subcutaneously by the D'Amour-Smith method has shown that this compound is about nine hundred times as potent as analgesic as meperidine hydrochloride on a molar basis in terms of the bases.

1-(3-oximino-3-phenylpropyl) - 4 - phenyl-4-propionoxy-piperidine is prepared as follows: Suspend 4.02 g. of 1-(3-oxo-3-phenylpropyl) - 4 - phenyl-4-propionoxypiperidine hydrochloride in 15 cc. of water and add an excess (slightly more than two molar equivalents) of 3.5% aqueous sodium hydroxide solution. Dissolve 1.0 g. of hydroxylamine hydrochloride in 10 cc. of water and add the hydroxylamine solution to the alkaline suspension. Add 10 cc. of ethanol and warm the resulting mixture with occasional stirring until all of the piperidine compound dissolve. After thet crystalline oximino derivative separates, chill the mixture in an ice bath. Collect the white crystalline product and recrystallize it once from methanol water and once from ethyl acetate to yield 1.4 g. (37% yield) of 1-(3-oximino-3-phenylpropyl)-4-phenyl-4-propionoxypiperidine, M.P. 180–181.2° C. (corr.).

*Analysis.*—Calcd. for $C_{23}H_{28}N_2O_3$: C, 72.56; H, 7.41; N, 7.36; O, 12.61. Found: C, 72.60; H, 7.33; N, 7.51; O, 12.78.

Pharmacological evaluation of 1-(3-oximino-3-phenylpropyl)-4-phenyl - 4 - propionoxypiperidine in aqueous solution administered to rats subcutaneously by the D'Amour-Smith method has shown that this compound is about three hundred times as potent an analgesic as meperidine hydrochloride on a molar basis in terms of the bases.

The foregoing description of the best modes of carrying out the invention is for purposes of illustration and does not limit the generality of the applicability of the inventive concept as herein set forth. Other 1-[omega-aromatic-omega-oxo-(lower-alkyl)] - 4 - aryl-4-(lower-acyloxy)piperidines and their acid-addition salts can be prepared in the manners above-described by substituting the molar equivalent quantities of the desired 4-aryl-4-piperidinol, omega-aromatic-omega-oxo-(lower - alkylating) agent, and lower -acylating agent for the corresponding reactants in the examples and are regarded by the applicant as the full equivalents of the particular embodiments of the invention herein specifically described and claimed.

The 1-[omega-aromatic-omega-oxo(and oximino)-(lower-alkyl)] - 4 - aryl-4-(lower-acyloxy)piperidines of the invention can be formulated in the manner conventional for potent analgesics, e.g., in liquid preparations in an aqueous for aqueous-ethanol menstruum or in solid form, e.g., as tablets or powders. The tablet formulations can be prepared using conventional excipients; and the powders can be dispensed in capsule form. These preparations can be administered orally or, in the case of the aqueous preparations, intramuscularly or subcutaneously.

I claim:

1-(3-oximino-3-phenylpropyl) - 4 - phenyl-4-propionoxypiperidine.

References Cited by the Examiner

UNITED STATES PATENTS

| | | | |
|---|---|---|---|
| 2,846,437 | 8/58 | Elpern | 260—294.3 |
| 2,850,498 | 9/58 | Pohland | 260—294.3 |
| 2,850,500 | 9/58 | Elpern | 260—294 |
| 2,904,550 | 9/59 | Pohland | 260—294.3 |
| 2,951,080 | 8/60 | Pohland | 260—294.3 |
| 2,962,501 | 11/60 | Cutler et al. | 260—294.3 |

OTHER REFERENCES

Janssen et al.: "Acta Physiol. et Pharmacol. Neerland," vol. 7, pp. 373–402 (1958).

NICHOLAS S. RIZZO, *Primary Examiner.*

IRVING MARCUS, DUVAL T. McCUTCHEN,
*Examiners.*